(12) United States Patent
Chang

(10) Patent No.: US 7,680,489 B2
(45) Date of Patent: Mar. 16, 2010

(54) METHOD FOR CONCURRENT MULTIPLE SERVICES IN A MOBILE COMMUNICATION SYSTEM

(75) Inventor: Woon Suk Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 1459 days.

(21) Appl. No.: 11/019,811

(22) Filed: Dec. 20, 2004

(65) Prior Publication Data

US 2005/0164731 A1    Jul. 28, 2005

Related U.S. Application Data

(62) Division of application No. 09/837,557, filed on Apr. 19, 2001, now Pat. No. 6,845,236.

(60) Provisional application No. 60/278,002, filed on Mar. 23, 2001.

(30) Foreign Application Priority Data

| Nov. 1, 2000 | (KR) | .......................... 10-2000-64622 |
| Dec. 20, 2000 | (KR) | .......................... 10-2000-79113 |
| Dec. 20, 2000 | (KR) | .......................... 10-2000-79114 |

(51) Int. Cl.
*H04M 3/42* (2006.01)

(52) U.S. Cl. .................... 455/414.1; 370/338; 370/410; 370/352; 370/356; 455/422.1

(58) Field of Classification Search .................. None
See application file for complete search history.

(56) References Cited

U.S. PATENT DOCUMENTS 5,884,175 A    3/1999   Schiefer et al.

| 6,141,554 | A | 10/2000 | Choi |
| 6,178,337 | B1 | 1/2001 | Spartz et al. |
| 6,560,457 | B1 | 5/2003 | Silver et al. |
| 6,731,621 | B1 | 5/2004 | Mizutani et al. |
| 6,798,762 | B1 | 9/2004 | Olson |
| 2001/0001089 | A1 | 5/2001 | Krishnamurthi et al. |
| 2002/0068565 | A1 | 6/2002 | Purnadi et al. |
| 2005/0181773 | A1 | 8/2005 | Chang |
| 2006/0178918 | A1* | 8/2006 | Mikurak ......................... 705/7 |
| 2006/0209806 | A1* | 9/2006 | Vanttinen ..................... 370/352 |
| 2008/0062893 | A1* | 3/2008 | Bloebaum et al. ........... 370/260 |
| 2009/0003341 | A1* | 1/2009 | Brown et al. ................. 370/389 |

* cited by examiner

*Primary Examiner*—Ajit Patel
(74) *Attorney, Agent, or Firm*—Lee, Hong, Degerman, Kang & Waimey

(57) ABSTRACT

A method for providing concurrent service in a mobile communication system is disclosed in which a SCCP connection identifier SLR/DLR of a lower layer and a Service Option Connection Identifier (SOCI) on an IOS message of the higher layer to be exchanged are transmitted when a SCCP connection is established between a BSC and a MSC, thereby providing additional services to those already requested from a mobile station after the SCCP connection establishment without stopping a currently used service. According to the method, the concurrent service is provided while minimizing the conventional call processing procedures on the interface between the BSC and the MSC, thereby allowing a subscriber to use new additional service without stopping the current service or concurrently use a plurality of services such as voice and packet data services. Furthermore, a flexible confront is possible to a future development direction of the network. Providing concurrent service is an essential function of the third generation mobile communication network in a multimedia environment.

30 Claims, 11 Drawing Sheets

SLR = Source Local Reference
DLR = Destination Local Reference

SLR = Source Local Reference
DLR = Destination Local Reference

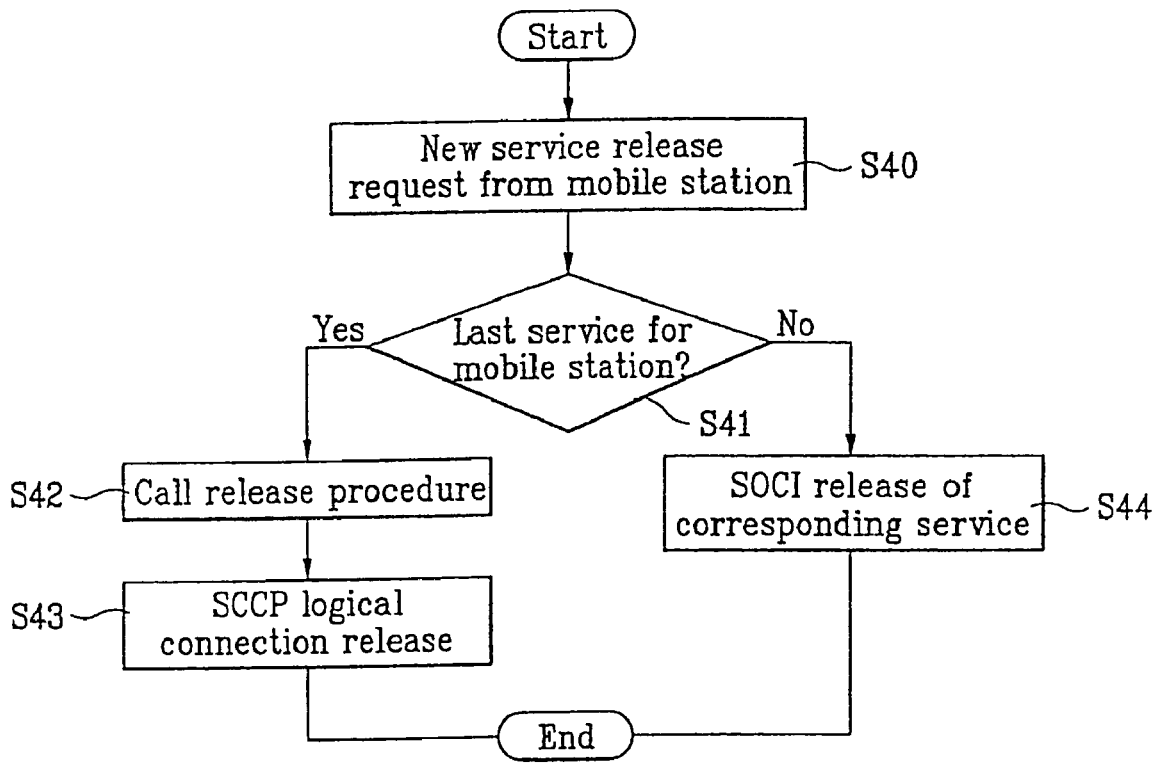

METHOD FOR CONCURRENT MULTIPLE SERVICES IN A MOBILE COMMUNICATION SYSTEM

CROSS-REFERENCE TO RELATED APPLICATIONS

This application is a division of U.S. application Ser. No. 09/837,557, filed Apr. 19, 2001, now U.S. Pat. No. 6,845,236, which claims the benefit of U.S. Provisional Application Ser. No. 60/278,002, filed on Mar. 23, 2001, and claims benefit of earlier filing date and right to priority to Korean Application Nos. P2000-64622 filed Nov. 1, 2000, P2000-79113 filed Dec. 20, 2000 and P2000-79114 filed Dec. 20, 2000, the contents of which are all hereby incorporated by reference herein in their entirety.

BACKGROUND OF THE INVENTION

1. Field of the Invention

The present invention relates to a mobile communication system, and in particular, to a method for concurrent multiple services on the interfaces between a BSC (Base Station Controller) and a MSC (Mobile Switching Center).

2. Background of the Related Art

As widely known in the prior art, a digital mobile communication network such as a Digital Cellular Network (DCN) or a Personal Communications Service (PCS), which are second generation mobile communication systems, can provide only one service to one mobile station at the same time and also can process only one service in a call processing mechanism for service. Therefore, a specific service in use can be switched into another type of service through service negotiation on the radio interface and call processing, but the current service would inevitably be stopped.

Concurrent service is a function in which a subscriber can be further provided with a new service while using the current service, without interrupting the current service. The subscriber can therefore be provided with a plurality of services, including voice and data service, at the same time. The concurrent service, however, cannot be provided by the call processing mechanisms and procedures provided by the second-generation mobile communication system such as DCN or PCS.

At present, the method for providing concurrent multiple services in a cdma2000 system is limited to the TIA/EIA/IS-2000A, which is a cdma2000 radio interface standard. However, a method for controlling concurrent service in the BSC and the MSC has not yet been defined. The procedures and message structures related to the concurrent service in the interface between the BSC and the MSC are not defined either.

Hereinafter, the procedures between the mobile station and the base station and the base station controller are assumed to follow the TIA/EIA/IS-2000A standard, thereby omitting a detailed description thereof, for the purpose of explanation.

FIG. 1 shows a related art method for setting No. 7 SCCP (Signaling Connection Control Part) connection between a BSC and a MSC.

Referring to FIG. 1, the current second generation digital mobile communication system is required to follow the call setup procedures corresponding to each service including voice, data, etc., to provide a specific single service. In particular, the system sets up one No. 7 SCCP for a call to provide the requested service, and discriminates the corresponding mobile station with SLR/DLR (Source/Destination Local Reference Number) allocated thereto to control the service between the BSC and the MSC.

Specifically, upon receiving an Origination/Page Response message on the radio interface that initiates the mobile originating/terminating call setup procedure, the BSC allocates a No. 7 SLR to uniquely identify the signaling connection in the interface between BSC and MSC, and constructs a Complete Layer 3 Information message, including a CM (Connection Management) Service Request/Page Response message in the IOS (Inter-Operability Specification) for initializing call processing of a corresponding mobile station. Then, the BSC transmits the No. 7 SCCP Connection Request message, including an IOS Complete Layer 3 Information message and SLR, to the MSC for the establishment of an SCCP signaling connection (S10).

When the BSC receives a SCCP Connection-Confirm message for confirming the SCCP connection establishment from the MSC, the SCCP signaling connection for the corresponding mobile station is completely established on the interface between the BSC and the MSC. Here, the SCCP Connection-Confirm message includes the connection SLR/DLR, which has been maintained until a service to the terminal is stopped and is applied to control the call (S11). It is the responsibility of the BSC and MSC to insure that no two calls have identical SCCP local reference numbers.

FIG. 2 shows a related art method for using the No. 7 SCCP connection SLR/DLR between the BSC and the MSC.

FIG. 2 describes additional detail of the control message for the corresponding mobile station, which includes the SCCP connection identifier SLR/DLR in the previously established SCCP connection state. As shown in FIG. 2, the control message transmitted from the MSC to the BSC includes the SLR (MSC)/DLR (BSC), and the control message transmitted from the BSC to the MSC includes the SCCP connection SLR/DLR, which are composed of SLR (BSC)/DLR (MSC).

FIG. 3 shows a related art method for controlling concurrent service as shown in FIG. 3, each mobile station MSi~MSn must set up individual calls to the BSC 102 for each requested service CON.REF 1~CON.REF 6. The BSC 102, however, only sets up one connection identifier to the MSC 103 for each mobile station.

Providing the current service using the foregoing second generation mobile communication system has various problems. For example, when a method for controlling the concurrent service by a conceptual call processing model for single service in the mobile communication system according to the related art as shown in FIG. 3 is used, the mobile station requires one call for each service. Assuming that one mobile station has the capability of setting up a maximum of 6 services simultaneously, the calls are identified in the base station/base station controller using an identifier such as sr_id or CON.REF on the radio interface. Though the base station/base station controller 102 can control each service option like this, the call control between the BSC and the MSC uses only one SCCP connection identifier (SLR/DLR), regardless of the number of services that one mobile station can make. In other words, if one service is being used, support of that service is stopped to switch to a new requested service, or the call setup request for the new requested service is rejected.

Thus, there is no identifier of each service for one mobile station in the current IOS call setup messages, such as Connection Management (CM) Service Request/Page Response and messages related to supplementary services between the BSC and the MSC of the conventional digital cellular (second generation) mobile communication system. The call is controlled using the SCCP connection identifier (SLR/DLR) allocated to the corresponding mobile station in the initial call setup for the service.

In short, the second generation mobile communication system uses a dimensional single service control method, in which the call is controlled on the basis of the mobile station. That is, the mobile station, the call, and the service are conceptually identified as a single event. Therefore, one mobile station cannot be provided with a plurality of services at the same time. Additionally, the current service must be stopped to provide another service, though a service switching can be carried out by the service negotiation on the radio interface.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method for concurrent service in a third generation mobile communication system, that substantially obviates problems caused by disadvantages of the related art.

It is another object of the present invention to provide a method for concurrent service in a third generation mobile communication system, that provides one subscriber with a plurality of services including voice, circuit data, packet data, facsimile data, etc. in a mobile communication system for providing various multimedia services. The present invention is applicable to the third generation mobile communication system (IMT-2000) specification of 3GPP2 (Third Generation Partnership Project 2) centered to North America.

It is another object of the present invention to provide a method for concurrent service with the addition of a Service Option Connection Identifier (SOCI) as a service identifier to IOS messages of the higher layer, and using the SOCI with the existing SCCP (Signaling Connection Control Part) connection identifier of a lower layer to discriminate the service in one mobile station established between a BSC and a MSC, thereby providing further services which are additionally requested from a mobile station after the SCCP connection establishment without stopping a currently used service.

It is another object of the present invention to provide a method for concurrent service in a CDMA mobile communication system in which a service option release procedure is added instead of a mobile station option release procedure when a release is requested on a current service from a mobile station or a switching station.

It is another object of the invention to provide a method for concurrent service in a CDMA mobile communication, in which the mobile station can receive a receiving packet data without stopping a voice call service even if the receiving packet data is generated from a network side when the packet data service is dormant and the voice call is in conversation.

In order to achieve at least these objects, in whole or in parts, there is provided a method for concurrent service in mobile communication systems, in which each subscriber communicates with another subscriber including the subscriber belonging to another service provider via a MSC, comprising setting up at least one call for each subscriber; and providing multiple communication services simultaneously to each of the subscribers by using service identifier SOCI allocated to each call for each service including the case of one call and an SCCP signaling connection identifier SLR/DLR for discrimination of each subscriber uniquely.

Herein, the BSC preferably allocates a SOCI as the identifier of a call or service and an SCCP connection identifier SLR/DLR dedicated to a specific mobile station when the communication service is the first requested from this mobile station to the BSC.

The allocating step preferably comprises transmitting a call setup message from the BSC to the MSC when the BSC receives a request for communication service from the mobile station or the MSC; the initial call setup message then requests a call setup procedure from the mobile station or MSC; and further the originating call setup message is a CM Service Request message, and the terminating call setup message is a Page Response message.

To further achieve at least the above objects, in whole or in parts, there is provided a method for providing concurrent service in communication systems comprising allocating a connection identifier (SOCI) for each of a plurality of services in a BSC to concurrently accept the plurality of services on a single logical signaling connection; and independently controlling each service connection between the BSC and a MSC by using information about each of the services and the SOCI of each service.

Herein, the logical signaling connection is preferably a SCCP signaling connection established between the BSC and the MSC, and a call control and supplementary service message is transmitted from the BSC to the MSC or from the MSC to the BSC and includes the SOCI when requested for an additional call control message and supplementary service messages from a specific mobile station after the SCCP connection is established.

Preferably, the additional call control message transmitted from the BSC to the MSC is selected from a group including a Connect message, reporting that a conversation state is set up in the mobile station, a Progress message, instructing the mobile station to produce or clear a local tone, and a Rejection message, reporting that the mobile station has rejected a Command message. The supplementary service message transmitted between BSC and MSC is preferably selected from a group including a Flash-with-Information message, reporting additional service information of the mobile station, and a Flash-with-Information Acknowledgment message, that acknowledges the Flash-with-Information message.

The service connection identifier SOCI preferably has an A1 element identifier field, length field, service option connection identifier field and a reserved bit field.

To further achieve the above objects, in whole or in parts, there is provided a method for concurrent service, comprising allocating a SOCI for an additional service if the additional service is requested while a service is being used on a logical signaling connection; and performing an additional service connection setup on the logical signaling connection by using information about the additional service and the SOCI of the additional service.

To further achieve the above objects, in whole or in parts, there is provided a method for concurrent service in mobile communication systems in which each subscriber communicates with another subscriber or another service provider via a MSC, comprising setting up at least one call for a first subscriber; if data should be transmitted from a second subscriber via a dormant call from the at least one call which is set up, activating the dormant call by using an identifier of the first subscriber and an identifier of the dormant call; and transmitting the data from the second subscriber to the first subscriber via the activated call.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a flow chart illustrating a call release for a concurrent service in a mobile communication system according to a preferred embodiment of the invention;

FIG. 7 is a drawing illustrating the structure of a SOCI according to a preferred embodiment of the invention;

DETAILED DESCRIPTION OF PREFERRED EMBODIMENTS

To provide concurrent service, a multimedia call processing model is proposed that separates a mobile station from a call or a service for two dimensional processing, thereby satisfying a third generation communication system environment. Also, a method is proposed that introduces a high layer service identifier SOCI (service option connection identifier) above the low layer signaling connection (SCCP connection) identifier SLR/DLR for mobile station dedicated signaling control between a BSC and a MSC, and adds the SOCI to IOS call control messages to process the multimedia call, thereby providing the concurrent service to one mobile station.

Figure 1:
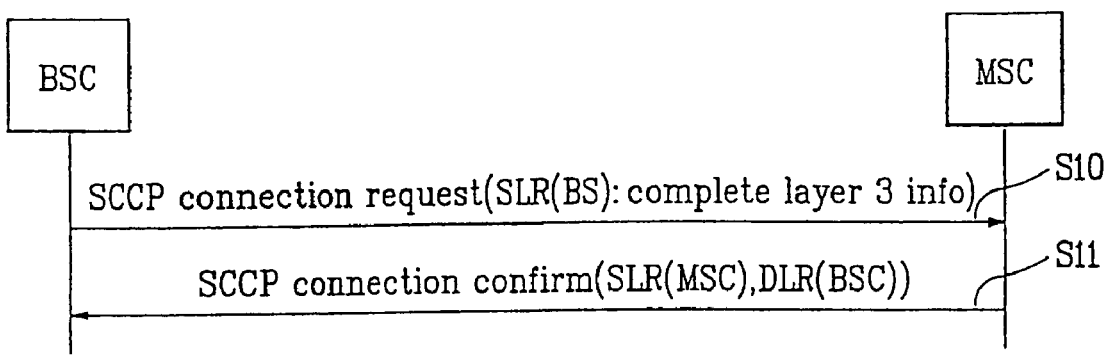
FIG. 1 is a drawing illustrating a method for establishment of No. 7 SCCP connection between a BSC and a MSC according to the related art.
Figure 2:
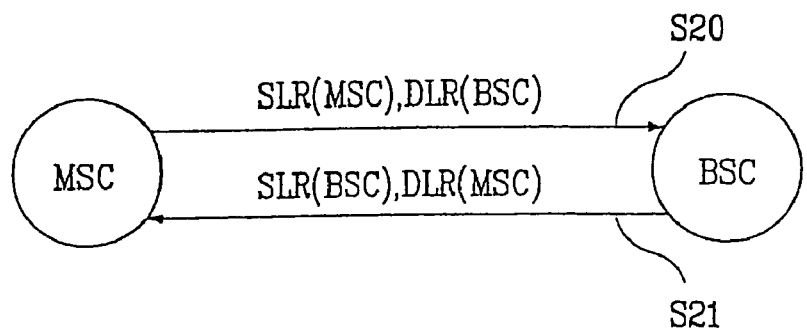
FIG. 2 is a drawing illustrating a method for using the No. 7 SCCP connection SLR/DLR between the BSC and the MSC according to the related art.
Figure 3:
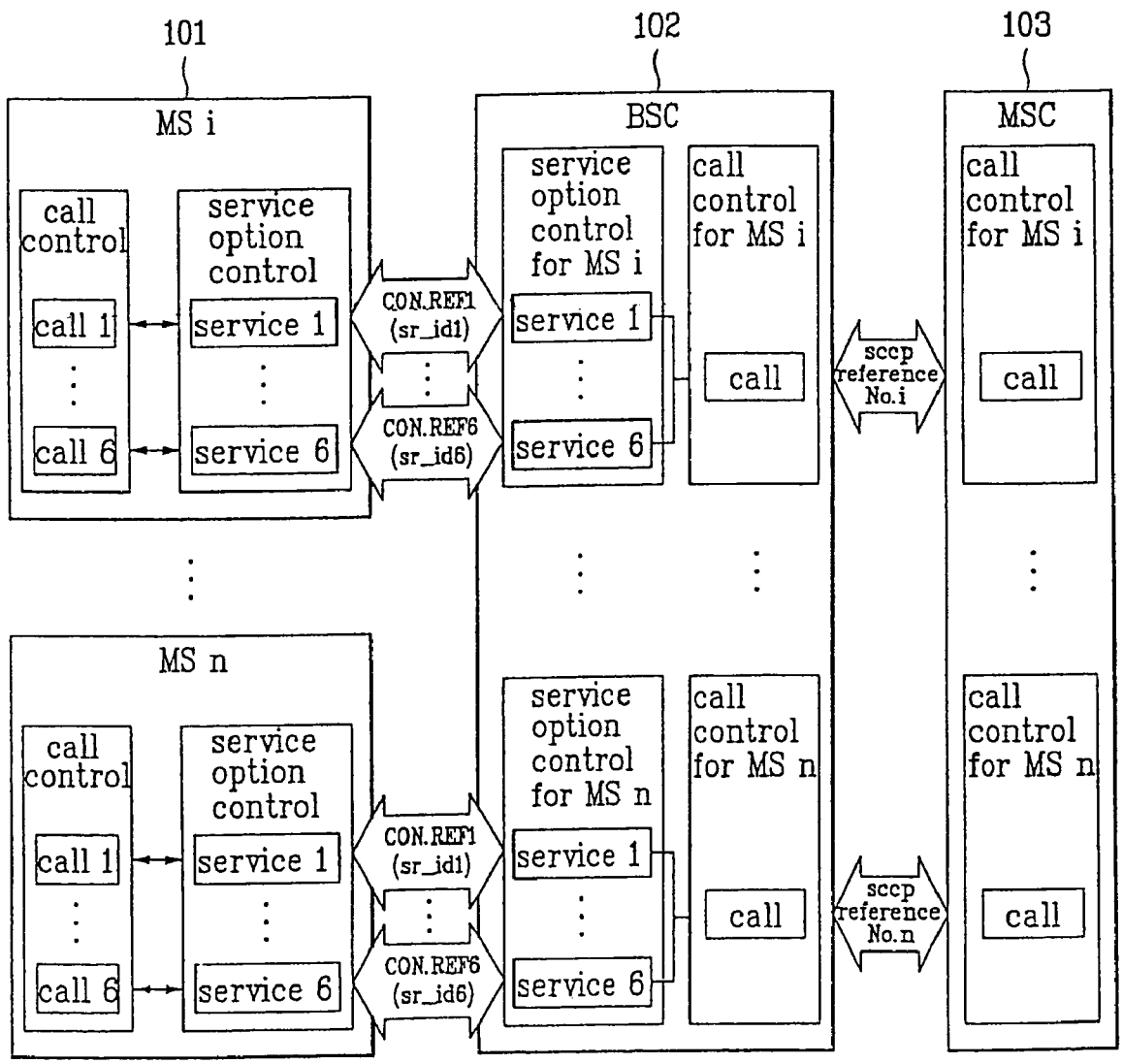
FIG. 3 is a drawing illustrating a conceptual view showing a related art call control method in a mobile communication system.
Figure 4:
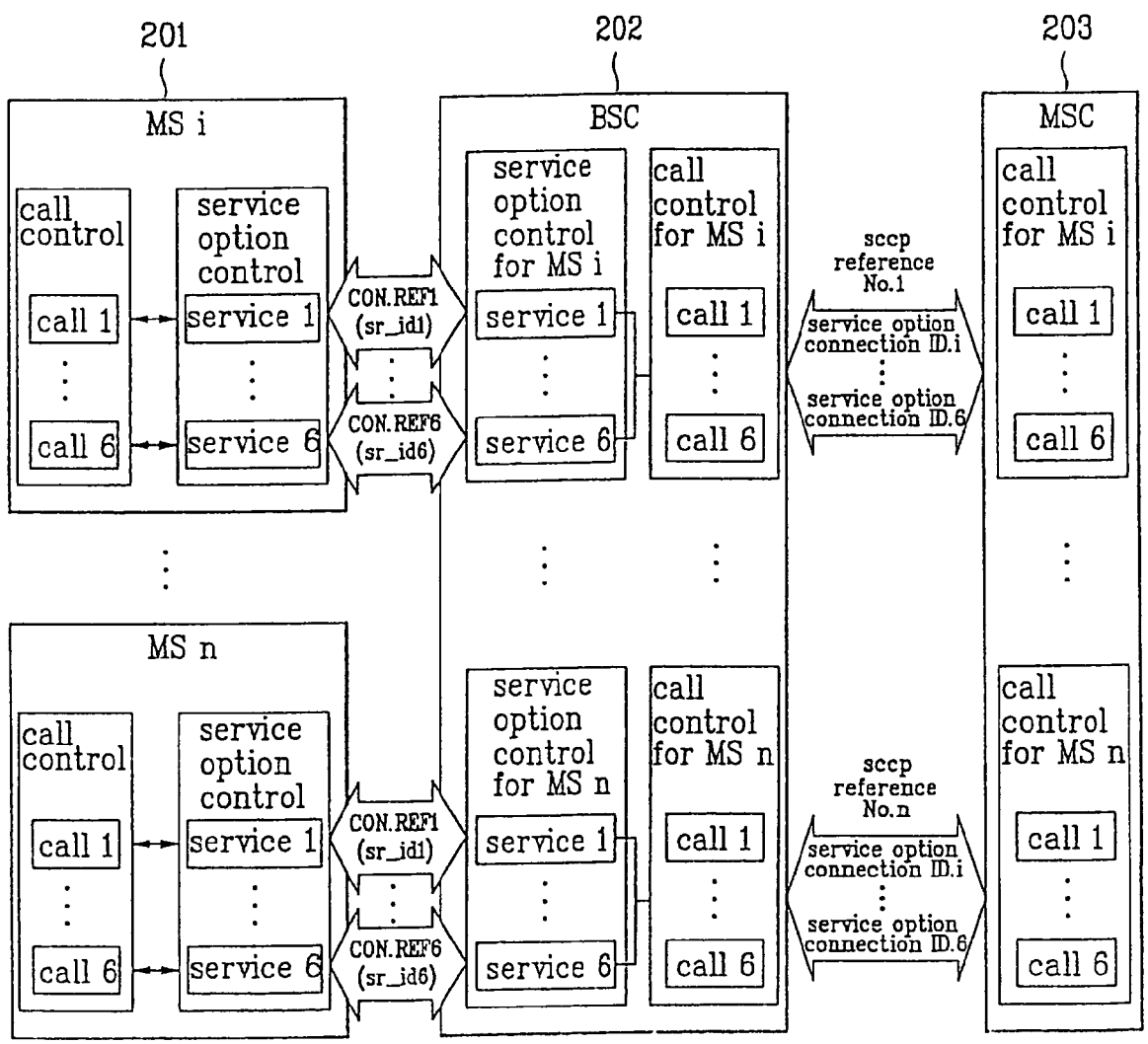
FIG. 4 is a drawing illustrating a conceptual view showing a call control method for a concurrent service in a mobile communication system according to a preferred embodiment of the invention.

Referring to FIG. 4, it is assumed that one mobile station 201 of n number of mobile stations 201 can receive up to 6 services at the same time. Here, the interface of each of the mobile stations 201 to the BSC 202 includes information such as CON_REF or sr_id for corresponding services in a SOCR (Service Option Connection Record), which is separately controlled on the radio interface for each concurrently provided service. The BSC 202 allocates one call based on the information such as CON_REF or sr_id about corresponding services, and accordingly allocates a SOCI and a SCCP connection identifier SLR/DLR. Therefore, new service requests from each of the mobile stations 201 is interfaced to each of the MSCs 203 as having one SCCP connection identifier SLR/DLR per mobile station, and one SOCI per service, in which the mobile station is provided with up to 6 services.

Therefore, the BSC 202, upon completing the SOCI allocation, transmits a CM Service Request/Page Response message that initiates a origination/termination call setup procedure, including the SOCI, between the BSC and the MSC to set up a service option connection between the BSC and the MSC, in which the No. 7 SCCP connection establishment procedures are required. This procedure is the same as the call processing procedures in the related art digital cellular (second generation) mobile communication system when the service is the first service for the corresponding mobile station.

Therefore, upon receiving a request for the first service from the mobile station 201, the BSC 202 allocates the SOCI and the SCCP connection identifier SLR/DLR to the mobile station 201. The BSC 202 then transmits the No. 7 SCCP Connection Request message, including an IOS Complete Layer 3 Information message having the SOCI and the SCCP connection identifier SLR/DLR, to the MSC 203 to establish a SCCP connection, so as to initiate the call setup procedure with the MSC 203 for the corresponding mobile station. The MSC 203 transmits a SCCP Connection Confirm message in response to the No. 7 SCCP Connection Request message to the BSC 202 to complete the SCCP connection establishment between the BSC 202 and the MSC.

Next, when the No. 7 SCCP connection for a corresponding mobile station is already established, for example, when the corresponding service is not the first one, and an additional service other than the currently provided service is requested, only an additional service option connection is required. Therefore, the BSC 202 allocates the SOCI for the additional service request of the mobile station 201 and exchanges messages necessary for the additional service option connection setup.

Parameters preferably included in the service CM Service Request message, which is transmitted from the BSC 202 to the MSC 203 to initiate an originating call setup procedure, are shown in Table 1. As shown in Table 1, SOCI parameters besides the parameters may also be included in the existing IOS standard according to the preferred embodiment.

TABLE 1

| Information elements | Element Direction |
| --- | --- |
| Protocol Discriminator | BS → MSC |
| Reserved - Octet | BS → MSC |
| Message Type | BS → MSC |
| CM Service Type | BS → MSC |
| Classmark Information Type 2 | BS → MSC |

TABLE 1-continued

| Information elements | Element Direction |
|---|---|
| Mobile Identity (IMSI) | BS → MSC |
| Called Party BCD Number | BS → MSC |
| Mobile Identity (ESN) | BS → MSC |
| Slot Cycle Index | BS → MSC |
| Authentication Response Parameter (AUTHR) | BS → MSC |
| Authentication Confirmation Parameter (RANDC) | BS → MSC |
| Authentication Parameter COUNT | BS → MSC |
| Authentication Challenge Parameter (RAND) | BS → MSC |
| Service Option | BS → MSC |
| Voice Privacy Request | BS → MSC |
| Radio Environment and Resources | BS → MSC |
| Called Party ASCII Number | BS → MSC |
| Circuit Identity Code | BS → MSC |
| Authentication Event | BS → MSC |
| Authentication Data | BS → MSC |
| PACA Reorigination Indicator | BS → MSC |
| User Zone ID | BS → MSC |
| IS-2000 Mobile Capabilities | BS → MSC |
| CDMA Serving One Way Delay | BS → MSC |
| SOCI (Service Option Connection Identifier) (Add) | BS → MSC |

Parameters included in the page response message, which is transmitted from the BSC 202 to the MSC 203 to initiate the terminating call setup procedure, are shown Table 2, in which SOCI parameters besides the parameters may be also included in the existing IOS standard according to the preferred embodiment.

TABLE 2

| Information elements | Element Direction |
|---|---|
| Protocol Discriminator | BS → MSC |
| Reserved - octet | BS → MSC |
| Message Type | BS → MSC |
| Classmark Information Type 2 | BS → MSC |
| Mobile Identity (IMSI) | BS → MSC |
| Tag | BS → MSC |
| Mobile Identity (ESN) | BS → MSC |
| Slot Cycle Index | BS → MSC |
| Authentication Response Parameter (AUTHR) | BS → MSC |
| Authentication Confirmation Parameter (RANDC) | BS → MSC |
| Authentication Parameter COUNT | BS → MSC |
| Authentication Challenge Parameter (RAND) | BS → MSC |
| Service Option | BS → MSC |
| Voice Privacy Request | BS → MSC |
| Circuit Identity Code | BS → MSC |
| Authentication Event | BS → MSC |
| Radio Environment and Resources | BS → MSC |
| User Zone ID | BS → MSC |
| IS-2000 Mobile Capabilities | BS → MSC |
| CDMA Serving One Way Delay | BS → MSC |
| SOCI (Service Option Connection Identifier) (Add) | BS → MSC |

In turn, the BSC 202 executes different call set up/release procedures on the basis of whether the request is for the first service from the specific mobile station or from a subsequent request. This procedure will be described in reference to FIG. 5 and FIG. 6.

Figure 5:
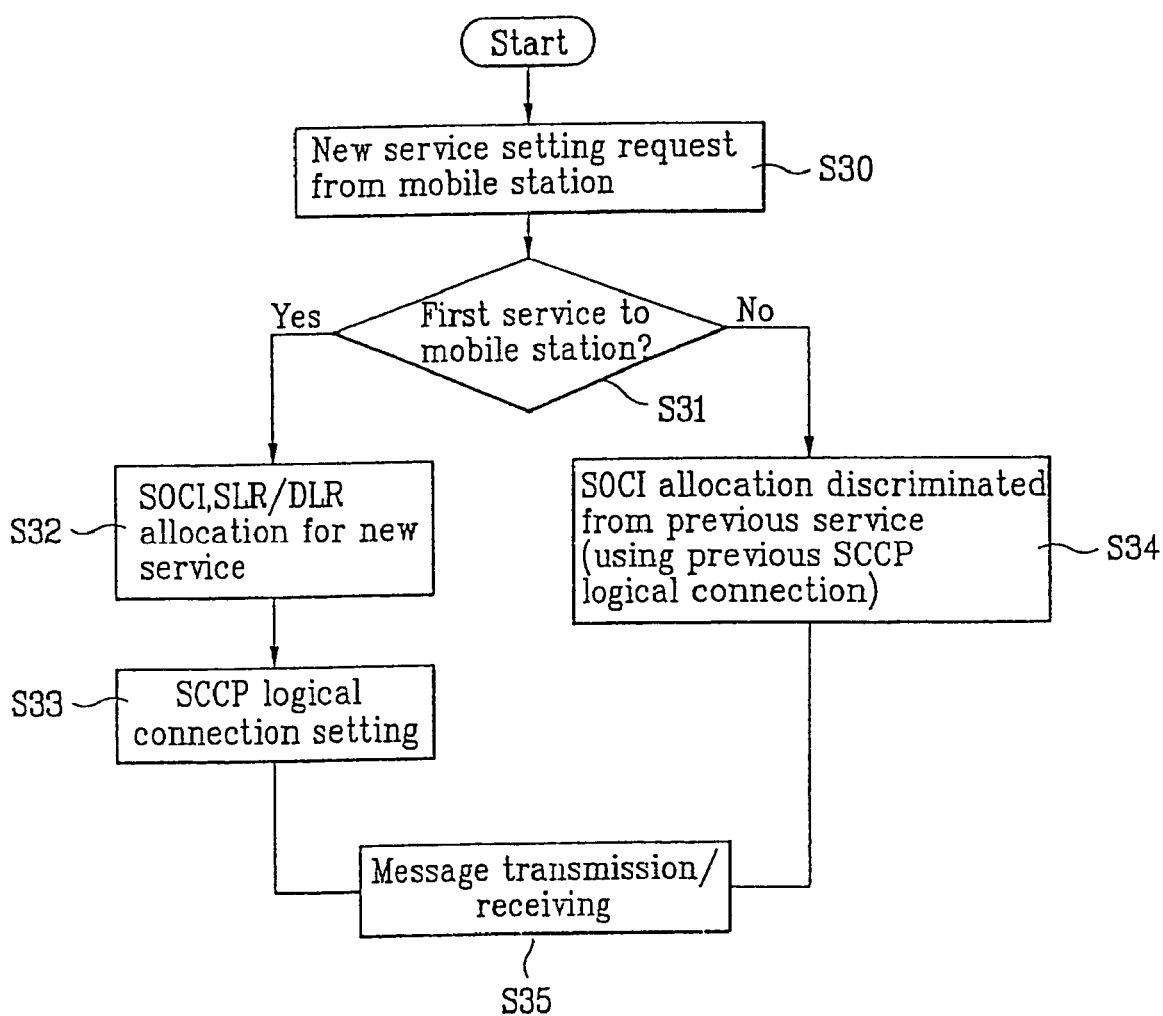
FIG. 5 is a flow chart illustrating a call setup for a concurrent service in a mobile communication system according to a preferred embodiment of the invention.

Referring to FIG. 5, a request to set up a new service is first received from a specific station (Step S30). The BSC then determines whether the requested service request is the first service request for the specific mobile station (Step S31).

If the requested service request from the mobile station is the first service request, the BSC allocates a SCCP logical connection identifier SLR/DLR, which is dedicated to this mobile station, and the SOCI, which is the service identifier of this mobile station (Step S32), and establishes a SCCP logical connection with the MSC (Step S33).

Then, the BSC and the MSC exchange messages satisfying the call processing procedures using the established SCCP logical connection (Step S35). Here, the call processing messages include the SOCI, which is the service identifier of the mobile station, and are exchanged through the SCCP logical signaling connection, which is discriminated by the SCCP logical connection identifier SLR/DLR allocated to each mobile station.

If, however, the requested service is not for the first service for the specific mobile station, the BSC allocates a SOCI, which is discriminated from that of the previous service by using the SCCP logical connection that has previously been established (Step S34). The BSC and the MSC exchange the messages satisfying the call processing procedures as described before (Step S35).

Next, referring to FIG. 6, a release procedure will be described. First, a request to release a service is received from a specific mobile station (Step S40). The BSC then decides whether the requested service is the last service for the specific mobile station (Step S41). If the service to be released is the last one, the previously established SCCP logic connection is released (Step S43). If, however, the service to be released is not the last one, the SOCI for the corresponding service is released, and this SOCI value is available to be allocated to a subsequently requested service from this mobile station (Step S44).

Referring next to FIG. 7, a structure of a SOCI according to a preferred embodiment is described.

As shown in FIG. 7, a preferred SOCI format includes an A1 element identifier field in which the SOCI is transmitted, a length field of the A1 element identifier field, a reserved field, and a SOCI field. The SOCI has an overall size of 3 octets (3×8 bits).

The A1 element identifier field and the length field are each 1 octet in size. The reserved field has the higher 5 bits in the remaining 1 octet, and the SOCI field has the lower 3 bits.

In addition to the call setup message, in the state that the SCCP connection is set up between the BSC and the MSC, the SOCI can additionally be included in transmitting an additional call setup and additional service messages that are requested from a specific mobile station. These additional call setup methods will be described with reference to the corresponding drawings.

Addition of a service for concurrent service is based upon the fact that the mobile station is currently being provided with at least one service. Therefore, it is assumed that the No. 7 SCCP connection is already set up for the corresponding mobile station on the interface between the BSC and the MSC.

Herein, two novel messages are defined for an additional service setup on the interface between the BSC and the MSC for concurrent service, in which a service is further provided when the mobile station is currently using at least one service.

First, an Additional Service Request message is herein defined as a message that is requested from the BSC to the MSC to further set up a specific service, in addition to the service that the corresponding mobile station is currently using. Specifically, it is a message requesting that an additional service option connection between the BSC and the MSC for the corresponding mobile station.

Parameters included in the above-described Additional Service Request message are shown in Table 3.

TABLE 3

| Information Elements | Element Direction |
|---|---|
| Protocol Discriminator | BS → MSC |
| Reserved Octet | BS → MSC |
| Message Type | BS → MSC |
| Called Party BCD Number | BS → MSC |
| Service Option | BS → MSC |
| Voice Privacy Request | BS → MSC |
| Called Party ASCII Number | BS → MSC |
| Circuit Identity Code | BS → MSC |
| Global Call Emergency Indicator | BS → MSC |
| SOCI (Service Option Connection Identifier) | BS → MSC |

Second, an Additional Service Notification message is defined herein as a message from the MSC to the BSC notifying the BSC that it is required to set up a specific service in addition to the service that the corresponding mobile station is currently using. Parameters included in the above-described Additional Service Notification message are shown in Table 4.

TABLE 4

| Information Elements | Element Direction |
|---|---|
| Message Type | BS → MSC |
| Mobile Identity (IMSI) | BS → MSC |
| Service Option | BS → MSC |

Figure 8:
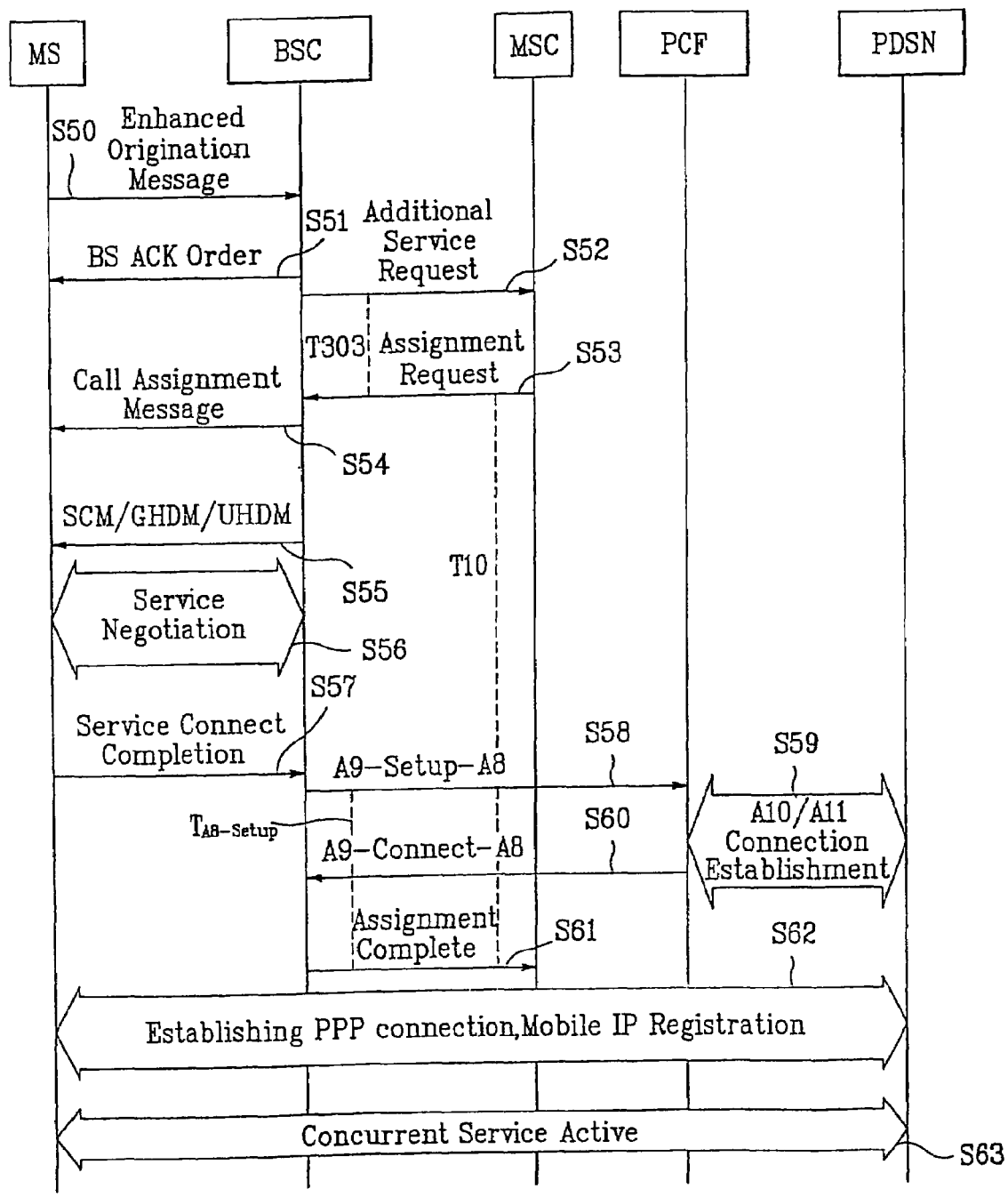
FIG. 8 is a drawing illustrating a call setup procedure in which a packet data service is requested in addition to a current service used by a mobile station according to a preferred embodiment of the invention.
Figure 9:
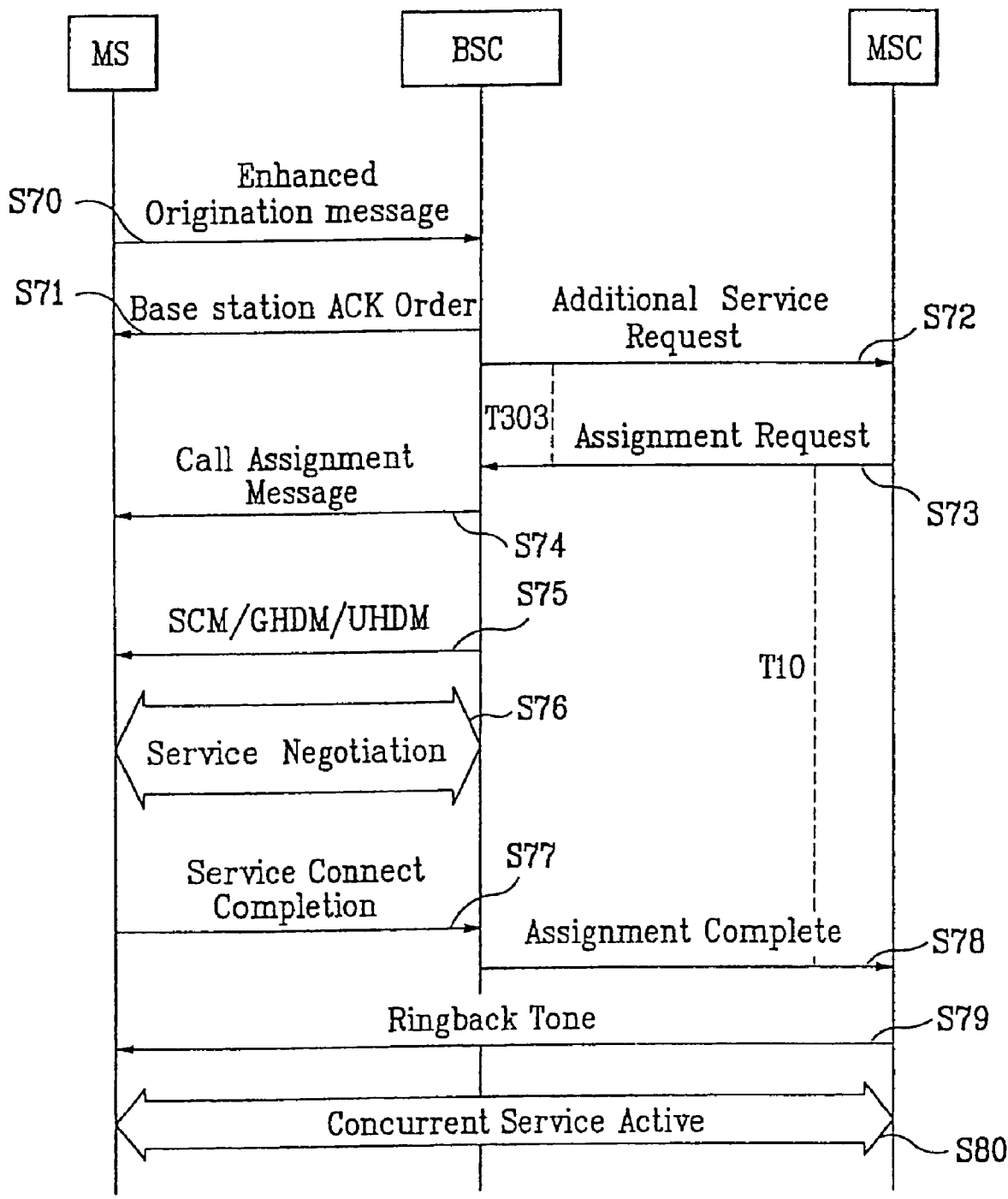
FIG. 9 is a drawing illustrating a call setup procedure in which a voice call service is requested in addition to a current service used by a mobile station according to a preferred embodiment of the invention.
Figure 10:
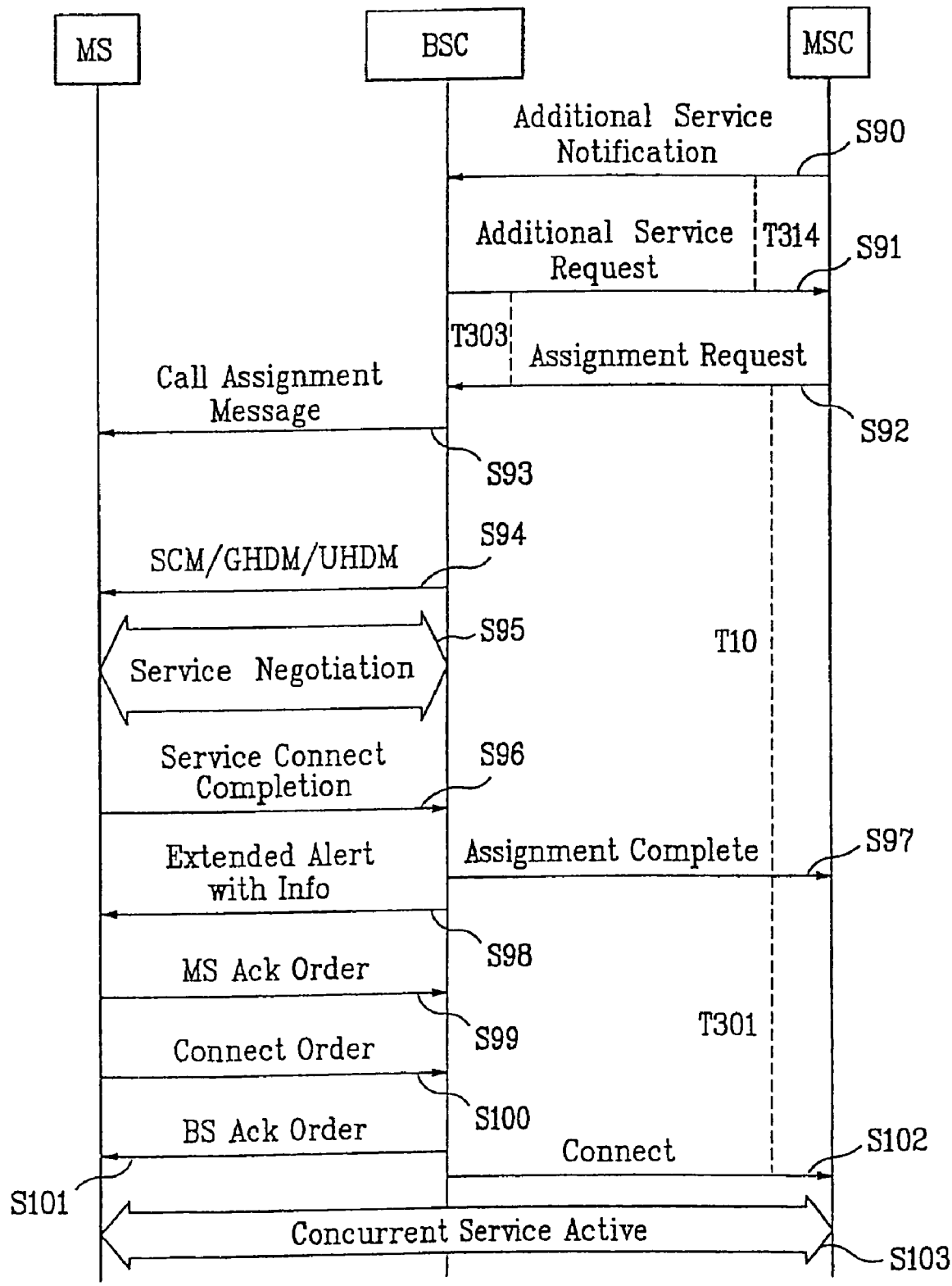
FIG. 10 is a drawing illustrating a call setup procedure in which a receiving voice call service is requested in addition to a current service used by a mobile station according to a preferred embodiment of the invention.

A procedure for concurrent service, in which a specific service is set up in addition to the current service, will be described next, with reference to three embodiments as shown in FIG. 8~FIG. 10.

FIG. 8 shows a call setup procedure in which packet data service is requested in addition to the current service used by the mobile station according to a preferred embodiment.

Referring to FIG. 8, the mobile station first transmits an Enhanced Origination message to the BSC by using a reverse dedicated signaling channel (Step S50). This message is sent on the radio interface, and includes a service option corresponding to packet data.

Upon receiving the Enhanced Origination message, the BSC transmits a Base Station Acknowledge Order message of a radio interface standard to the mobile station (Step S51). It then allocates a SOCI for the additional packet data service, and transmits a 3G-IOS Additional Service Request message, including the SOCI and a packet data service option, to the MSC (Step S52). This is done to request an additional service option connection setup for the corresponding mobile station with the MSC and to activate a timer T303.

Upon receiving the Additional Service Request message, the MSC does not allocate an additional conversation path, since the additional service is a packet data service. It does, however, transmit a 3G-IOS Allocation Request message, which requests a radio resource allocation for the additional packet data service, to the BSC (Step S53).

Upon receiving the Allocation Request message, the BSC stops the timer T303, and transmits a Call Allocation message of the radio interface standard to the mobile station by using a forward dedicated signaling channel so that the mobile station may proceed with a call processing for the additional packet data service (Step S54).

After transmitting the Call Allocation Message, the BSC sends one message selected from a group including SCM (Service Connect Message), GHDM (General Handoff Direction Message), and UHDM (Universal Handoff Direction Message) of the radio interface standard to the mobile station to initialize a service option connection setup for the additional packet data service with the mobile station (Step S55).

Upon receiving the selected message (SCM, GHDM or UHDM), the mobile station proceeds with a service negotiation procedure on the radio interface standard with the BSC (Step S56). The mobile station then notifies the BSC that the service option connection setup for the packet data service is completed through a Service Connect Completion message (Step S57).

Upon receiving the Service Connect Completion message, after completion of the service option connection setup, the BSC transmits a 3G-IOS A9-Setup-A8 message to a packet control function (PCF). This is done to request a packet bearer setup of an A8 interface (Step S58).

Upon receiving the A9-Setup-A8 message, the PCF performs an A10/A11 interface connection setup procedure with a PDSN (Packet Data Serving Node) (Step S59).

When the A10/A11 interface setup is completed between the PCF and the PDSN, the PCF transmits a 3G-IOS A9-Connect-A8 message to the BSC to indicate that the packet bearer setup of the A8 interface is completed (Step S20).

After the packet bearer setup of the A8 interface is completed, the BSC transmits a 3G-IOS Allocation Complete message to the MSC to notify that the packet data service is ready for initialization (Step S61).

Simultaneously with the Allocation Complete message transmission from the BSC to the MSC, the mobile station preferably performs a PPP (Point-to-Point Protocol) connection with the PDSN and a mobile IP registration (Step S62).

The mobile station is PPP connected and allocated with a mobile IP so that the mobile station is further provided with the packet data service in addition to the current service (Step S63).

Referring next to FIG. 9, a call setup procedure in which voice call service is requested in addition to the current service used by the mobile station is described, according to a preferred embodiment.

As shown in FIG. 9, the mobile station first transmits an Enhanced Origination message to the BSC by using the reverse dedicated signaling channel (Step S70). This message is transmitted on the radio interface and includes a service option corresponding to a voice call.

Upon receiving the Enhanced Origination message, the BSC transmits a Base Station Acknowledge Order message of the radio interface standard to the mobile station (Step S71). The BSC then allocates a SOCI for the additional voice call service, and transmits a 3G-IOS Additional Service Request message, including the SOCI and a voice call service option, to the MSC (Step S72). This is done to request an additional service option connection setup with the MSC for the mobile station and to activate timer T303.

Upon receiving the Additional Service Request message, since the additional service is a voice call, the MSC allocates conversation path resources on the interface with the BSC and transmits a 3G-IOS Allocation Request message to the BSC (Step S73).

Upon receiving the Allocation Request message, the BSC stops the timer T303. It also transmits a Call Allocation message of the radio interface standard to the mobile station by using a forward dedicated signaling channel so that the mobile station may proceed with a call process for the additional voice call service (Step S74).

After transmitting the Call Allocation Message, the BSC sends one message selected from a group including SCM, GHDM, and UHDM of the radio interface standard to the mobile station to initialize a service option connection setup for the additional voice call service with the mobile station (Step S75).

Upon receiving the selected message (SCM, GHDM, or UHDM), the mobile station proceeds with a service negotiation procedure on the radio interface standard with the BSC (Step S76). The mobile station then notifies the BSC that the service option connection setup for the voice call service is completed through a Service Connect Completion message (Step S77).

Upon receiving the Service Connect Completion message, the BSC transmits a 3G-IOS Allocation Complete message to the MSC, to indicate that a radio resource allocation and a conversation path setup between the BSC and the MSC for the voice call service are completed (Step S78).

Upon receiving the Allocation Complete message, the MSC transmits a Ring-Back tone. The Ring-Back tone notifies the mobile station that the voice call procedure has proceeded on the conversation path setup for the voice call, and that a receiving subscriber side bell is ringing. Thus the calling subscriber can know that the bell is ringing to the receiving subscriber (Step S79).

When the receiving subscriber recognizes the voice call and responds to it, the calling subscriber can speak with him/her, and thus the mobile station is further provided with the voice call service in addition to the service currently in use (Step S80).

Referring next to FIG. 10, a call setup procedure is described in which a receiving voice call service is requested in addition to the current service used by the mobile station, according to a preferred embodiment.

As shown in FIG. 10, the MSC transmits a 3G-IOS Additional Service Notification message to the BSC, to further request a receiving voice call service setup to the mobile station which is currently using a data service, and activates the timer T314 (Step S90).

Upon receiving the Additional Service Notification message, the BSC allocates a SOCI for the additional voice call service, and then transmits a 3G-IOS Additional Service Request message, including the SOCI and a voice call service option, to the MSC to request an additional service option connection setup for the corresponding mobile station with the MSC and activate the timer T303 (Step S91).

Upon receiving the Additional Service Request message, the MSC stops the timer T314, and allocates the conversation resources on the interface with the BSC for the additional voice call service. It also transmits a 3G-IOS Allocation Request message to the BSC to request the radio resource allocation of the BSC for the additional voice call (Step S92).

Upon receiving the Allocation Request message, the BSC stops the timer 303, and transmits a Call Allocation message to the mobile station of the radio interface standard using the forward dedicated signaling channel. The mobile station may then proceed with a call process for the additional voice call service (Step S93).

After transmitting the Call Allocation Message, the BSC sends one message selected from a group including SCM, GHDM, and UHDM of the radio interface standard to the mobile station to initialize a service option connection setup for the additional voice call service with the mobile station (Step S94).

Upon receiving the selected message (SCM, GHDM, or UHDM), the mobile station proceeds with a service negotiation procedure on the radio interface standard with the BSC (Step S95). The mobile station then notifies the BSC that the service option connection setup for the voice call service is completed through a Service Connect Completion message (Step S96).

Upon receiving the SCCM, the BSC transmits a 3G-IOS Allocation Complete message to the MSC, indicating that a radio resource allocation and a conversation path setup between the BSC and the MSC for the voice call service are completed (Step S97). The BSC then transmits an Extended Alert with Information message of the radio interface standard to the mobile station so that the bell may ring, thereby notifying the mobile station of the received voice call (Step S98).

Upon receiving the Extended Alert with Information message, the mobile station responds to the BSC with a MS Acknowledge Order of the radio interface standard to indicate receipt of the message. This means that the bell is ringing in the mobile station (Step S99).

If the subscriber recognizes and responds to the voice call, the mobile station transmits an Connect Order of the radio interface standard to the BSC (Step S100), and the BSC responds to the mobile station with a BS Acknowledge Order, indicating receipt of the Connect Order (Step S101). After that, the BSC transmits a 3G-IOS Connect message to the MSC to indicate that the subscriber responded to the received voice call (Step S102). The mobile station is thus provided with the voice call service in addition to the currently established data service (Step S103).

Meanwhile, when one service is stopped and the other service is continuously used in the concurrent service, a release procedure is required for the service to be stopped. Therefore, two novel messages related to release of any single service are herein defined on the interface between the BSC and the MSC.

First, a Service Release message is defined as a message that requests the release of a specific service of the mobile station that is under the concurrent service. The Service Release Message is sent from the BSC to the MSC or from the MSC to the BSC. The Service Release message is used only during the concurrent service to release a single message. In turn, a conventional 3G-IOS Clear procedure is applied to release a single service of the mobile station that is being provided only with the single service.

In other words, the mobile station will still use a service even after the service release procedure. If the conventional clear procedure is performed, the mobile station becomes idle without using any service.

Parameters included in the foregoing Service Release message are shown in Table 5.

TABLE 5

| Information Element | Element Direction |
| --- | --- |
| Protocol Discriminator | BSC ↔ MSC |
| Reserved Octet | BSC ↔ MSC |
| Message Type | BSC ↔ MSC |
| SOCI (Service Option Connection Identifier) | BSC ↔ MSC |
| Cause | BSC ↔ MSC |
| Cause Layer 3 | BSC ↔ MSC |

The second novel Release Message, the Service Release Complete message, is a message from the BSC to the MSC or the MSC to the BSC indicating that a release procedure is completed for a specific service requested through the Service Release message. That is, it is a response message to the Service Release message.

Parameters included in the Service Release Complete message are shown in Table 6.

TABLE 6

| Information Element | Element Direction |
| --- | --- |
| Protocol Discriminator | BSC ↔ MSC |
| Reserved - Octet | BSC ↔ MSC |
| Message Type | BSC ↔ MSC |
| SOCI (Service Option Connection Identifier) | BSC ↔ MSC |

A concurrent service call release procedure using the above defined Service Release or Service Release Complete message in the mobile terminal will be described with reference to FIG. 11 and FIG. 12.

Figure 11:
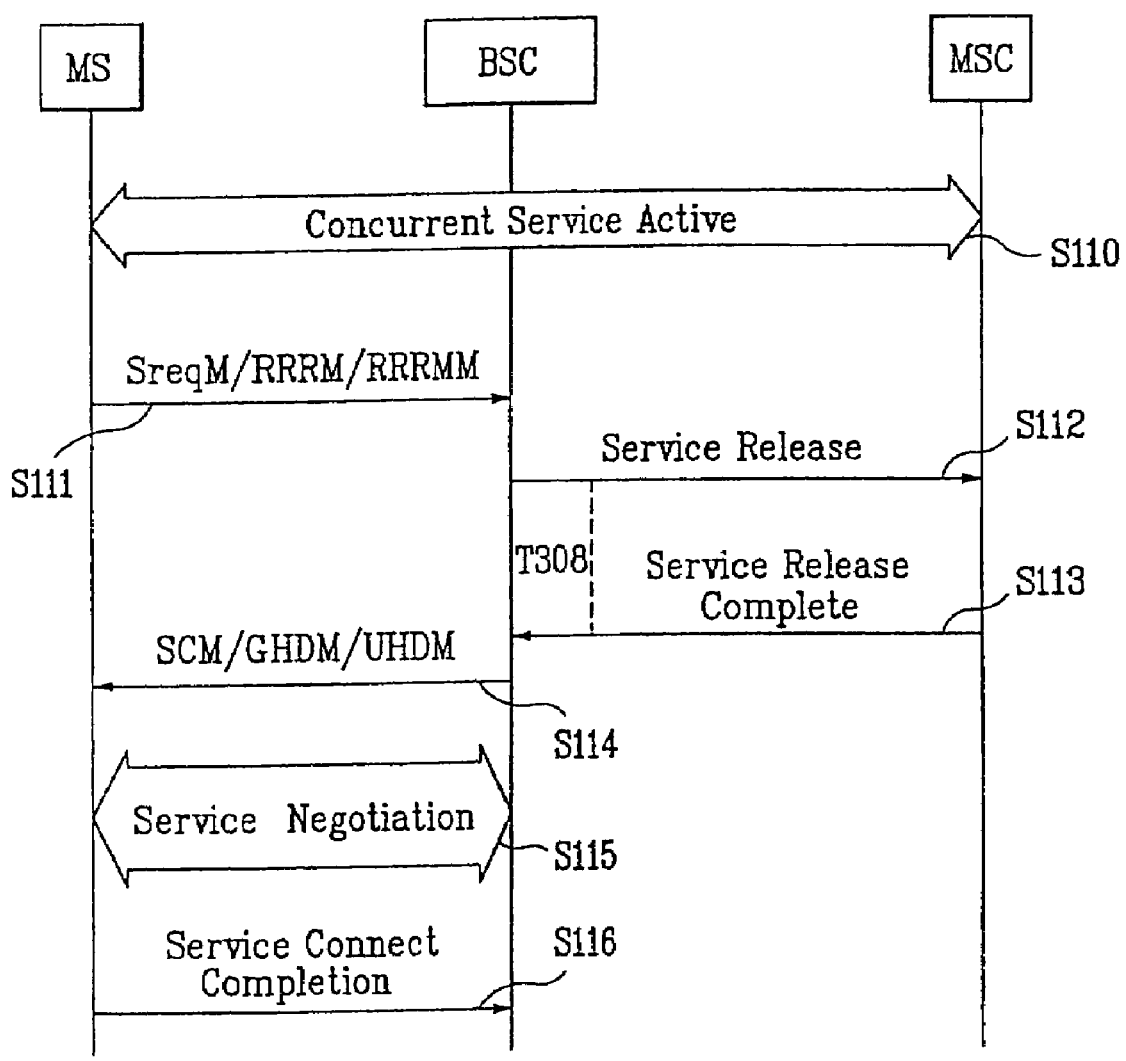
FIG. 11 is a drawing illustrating a call release procedure in which a specific service is released from a mobile station which is under concurrent service according to a preferred embodiment of the invention.

Referring to FIG. 11, a call release procedure is described in which a specific service is released from a mobile station that is under concurrent service, according to a preferred embodiment.

As shown in FIG. 11, the mobile station that is under concurrent service (Step S110) transmits one message selected from a group including Service Request message, Resource Release Request message, and Resource Release Request Mini message of the radio interface standard to the BSC (Step S111).

Upon receiving the selected one of the group including Service Request message, Resource Release Request message, and Resource Release Request Mini message of radio interface standard, the BSC transmits a 3G-IOS Service Release message, including a SOCI for a specific service, to the MSC for release of the resources allocated to the specific service. This initializes a release procedure for the corresponding service of the mobile station under concurrent service and activates a timer T308 (Step S112).

Upon receiving the Service Release message, the MSC releases all of the resources, including the SOCI and the conversation path resources, for the corresponding service. The MSC then transmits a 3G-IOS Service Release Complete message to the BSC, indicating completion of the release procedure of the MSC for the corresponding service. Upon receiving the 3G-IOS Service Release Complete message, the BSC stops the timer T308 (Step S113).

The BSC then releases all of the resources, including the SOCI and the radio resources, for the corresponding service, and transmits one message selected from a group including SCM, GHDM, and UHDM to the mobile station. This initializes a service option connection release procedure for the corresponding service (Step S114).

Upon receiving the selected message (SCM, GHDM, or UHDM), the mobile station proceeds to a service negotiation procedure on the radio interface standard (Step S115). It then notifies the BSC that release of the service option connection is completed for the release requested service through a Service Connect Completion Message (Step S116).

Figure 12:
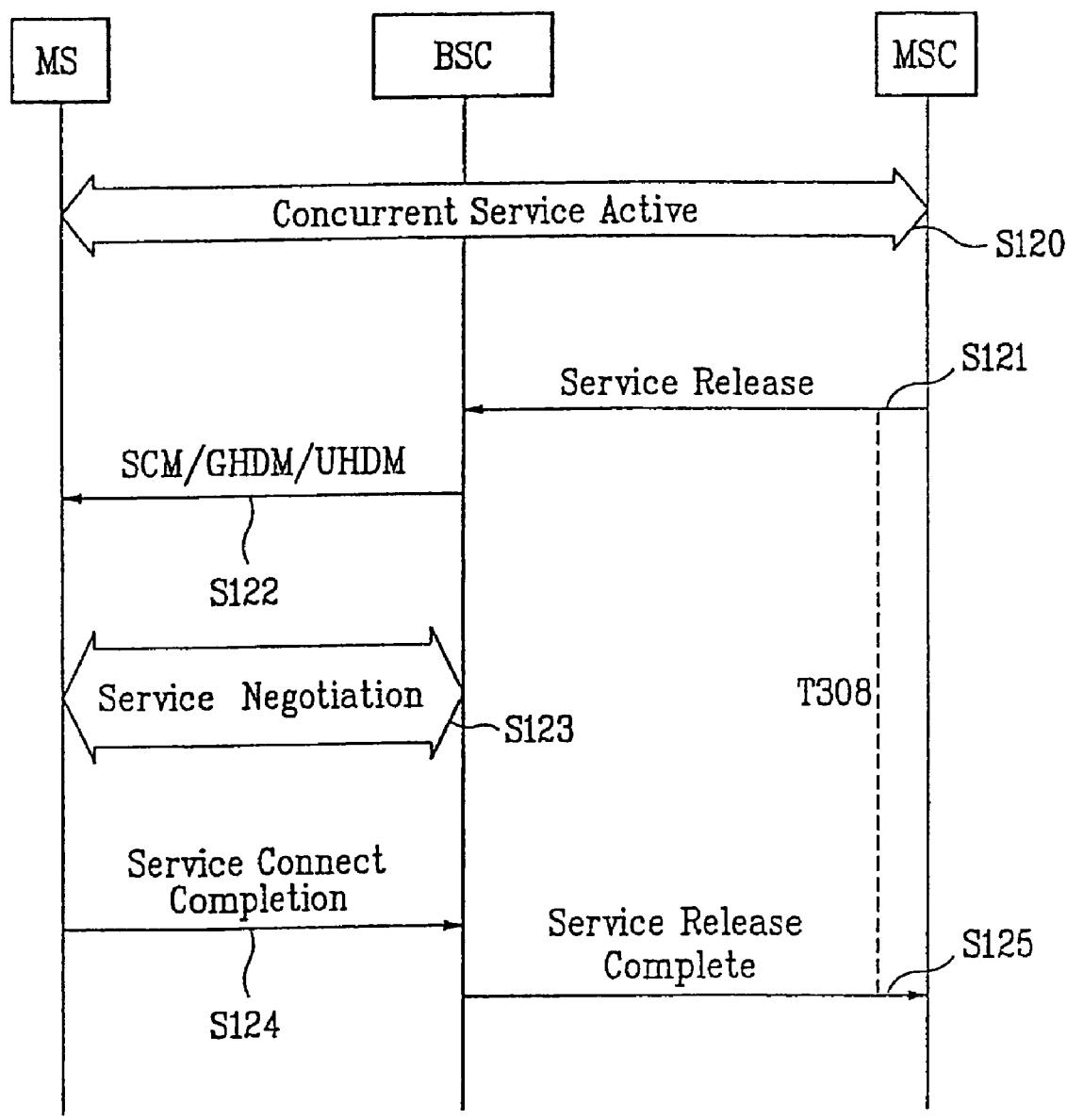
FIG. 12 is a drawing illustrating a call release procedure in which a specific service is released from a switching station which is under concurrent service according to a preferred embodiment of the invention.

Referring next to FIG. 12, a call release procedure is described in which a specific service is released from a switching station that is under concurrent service, according to a preferred embodiment. As shown in FIG. 12, in order to release a specific single service of the mobile station that is under concurrent service (Step S120), the MSC transmits a 3G-IOS Service Release message to the BSC including a SOCI for the service to be released. This initializes a release procedure for the corresponding service of the mobile station, and activates the timer T308 (Step S121).

Upon receiving the Service Release message, the BSC transmits one message selected from a group including SCM, GHDM, and UHDM of the radio interface standard to the mobile station to initialize a service option connection release procedure for the corresponding service with the mobile station (Step S122).

Upon receiving the selected message (SCM, GHDM, or UHDM), the mobile station proceeds with a service negotiation procedure on the radio interface standard (Step S123). It then notifies the BSC that the service option connection release is completed for the service to be released through a Service Connect Completion message (Step S124).

Upon receiving the Service Connect Completion message, the BSC releases all of the resources including the SOCI and the radio resources for the corresponding service. It also transmits a 3G-IOS Service Release Complete message to the MSC indicating that the release procedure of the BSC for the corresponding service is completed, and the MSC stops the timer T308 upon receiving the 3G-IOS Service Release Complete message (Step S125).

Next, according to a preferred embodiment, a definition of a novel message is proposed to add a method for enabling the receiving mobile station to transfer the packet data and a procedure for reactivating packet data service. Specifically, a procedure to reactivate the packet data service on the interface between the BSC and the MSC is added to set up the concurrent service when receiving packet data is generated from the network side to the mobile station available for the concurrent service in a state that the packet data service is dormant and the voice call is active.

Figure 13:
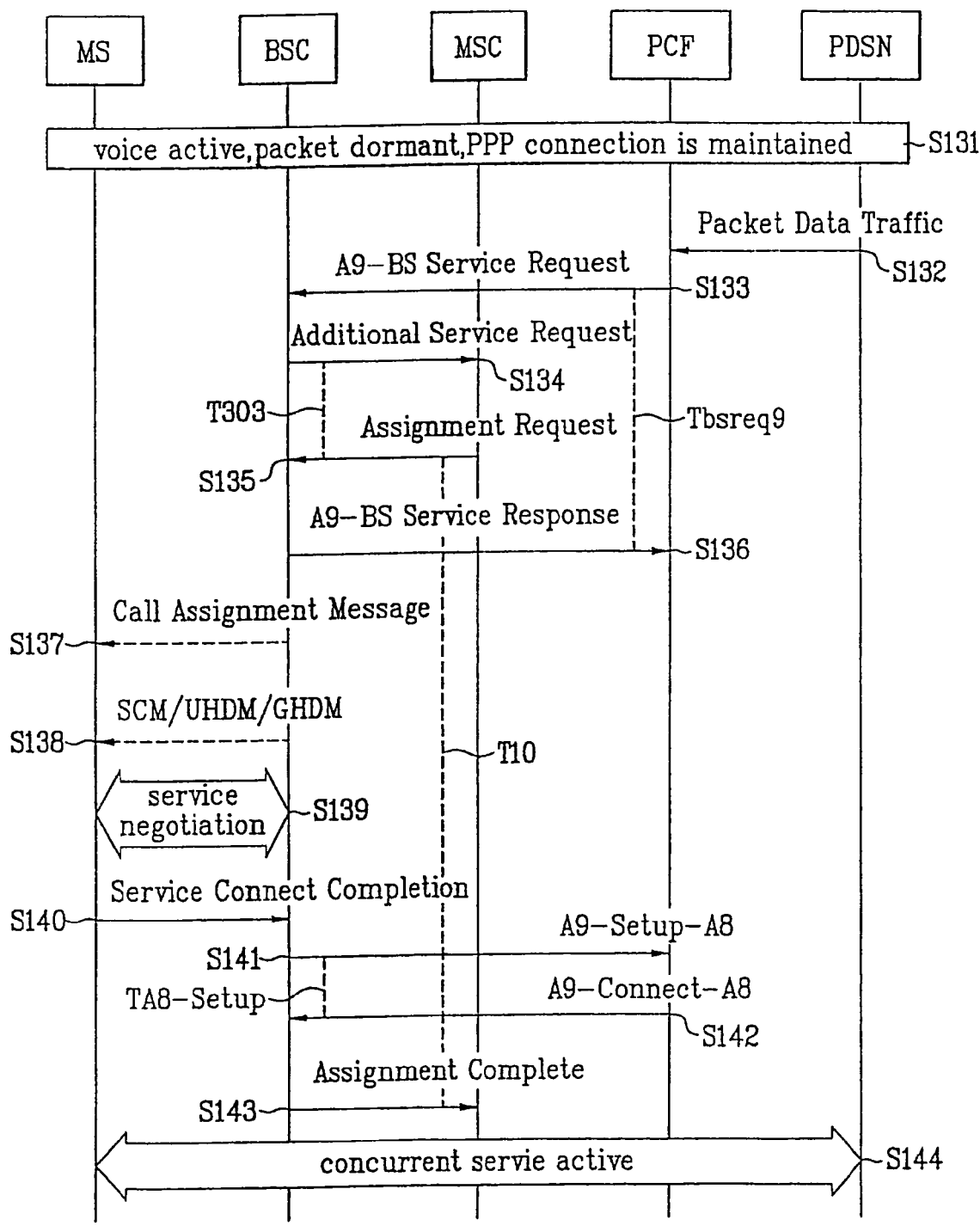
FIG. 13 is a drawing illustrating a procedure of reactivating a receiving packet data in a mobile station in which a packet data call is dormant and a voice call is activated according to a preferred embodiment of the invention.

Referring to FIG. 13, a procedure of reactivating a receiving packet data in a mobile station is described in which a packet data call is dormant and a voice call is activate, according to a preferred embodiment.

The mobile communication system of the invention preferably includes a mobile station 301 for supporting the concurrent service, a BSC 302 for allocating the radio resource in response to a service request from the mobile station 301, and a MSC 303 for controlling a call of the mobile station. It also includes a PCF 304 for supporting the packet data service of the concurrent service, and a PDSN 305 interfacing with the PCF and routing the packet data transferred from the PCF or the Internet.

As shown in FIG. 13, the mobile station is in the state that the packet data service is dormant and the voice call is being activated, and where a PPP is set up with the PDSN (Step S131).

Also, it is assumed that the A10/A11 connection is set up between the PCF to which the mobile station belongs and that the PDSN is interfaced with the PCF. It is also assumed that the voice call service is proceeding while the radio source and the conversation path source are allocated between the mobile station and the BSC or between the BSC and the MSC. Also, it is assumed that the A9/A8 connection is not set up between the PCF and the BSC.

Therefore, upon receiving from the network the packet data which the mobile station is supposed to receive, the PDSN uses the PPP and the A10/A11 connection maintained for the communication with the corresponding mobile station to transmit the receiving packet data traffic to the PCF (Step S132).

Upon receiving the packet data traffic, the PCF recognizes that the corresponding mobile station is dormant, transmits a 3G-IOS A9-BSC Service Request message to the BSC to reactivate the packet data service, and then activates a timer Tbsreq9 (Step S133).

Upon receiving the A9-BS Service Request message, the BSC allocates the SOCI for the packet data service, and then transmits a 3G-IOS Additional Service Message to the MSC to additionally set up the packet data call and activates the timer T303 (Step S134). The Additional Service Request message preferably includes the SOCI and the packet data service option to set up the call for the packet data as described hereinbefore.

Upon receiving the Additional Service Request message, the MSC does not allocate the additional conversation path on the interface with the BSC, since the added service is packet data service. The MSC transmits the 3G-IOS Allocation Request message requesting the radio source allocation and the A8 interface (user traffic) connection between the BSC and the PCF for the additional packet data service and then activates a timer T10 (Step S135).

Upon receiving the Allocation Request message, the BSC stops the timer T303 and transmits a 3G-IOS A9-BS Service Response message to the PCF to indicate that the reactivation of the packet data is proceeding (Step S136). According to this notification, the PCF stops the timer Tbsreq9.

Meanwhile, the BSC transmits the A9-BS Service Response message to the PCF and then transmits a Call Allocation Message of the radio interface standard by using the forward dedicated signaling channel so that the mobile station can continue the call process for the reactivated packet data service (Step S137). Also, the BSC transmits one message selected from a group including SCM, GHDM, and UHDM to the mobile station to initialize a service option connection setup for the additional packet data service with the mobile station (Step S138).

Upon receiving the selected message (SCM, GHDM, or UHDM), the mobile station continues the service negotiation procedure on the radio interface standard (Step S139). It then notifies the BSC that the service option connection is completed for the additional packet data service by sending a Service Connection Completion message (Step S140).

Upon receiving the Service Connection Completion message, after the service option connection setup is completed, the BSC transmits a 3G-IOS A9-setup-A8 (A9-Setup-A8) message to the PCR to request a packet bearer connection setup of the A8 interface and activates a timer TA8-Setup (Step S141).

When the A8 connection setup is completed between the BSC and the PCF, the PCF transmits a 3G-IOS A9-Connect-A8 message, indicating that the packet bearer setup of the A8 interface is complete (Step S142).

Upon receiving the A9-Connect-A8 message, the BSC transmits the 3G-IOS Allocation Complete message to the MSC, indicating that the packet data service is ready for initialization (Step S143).

The mobile station is thus additionally provided with the packet data service together with the currently provided voice call service, and the PCF transmits the packet data to the receiving mobile station (S144).

Parameters included in the "Connect" message, which is transmitted from the BSC to the MSC to report that the conversation state is set up in the terminating mobile station, are shown in Table 7, in which the SOCI is additionally included in transmission.

TABLE 7

| Information elements | Element Direction |
| --- | --- |
| Protocol Discriminator | BS → MSC |
| Reserved - Octet | BS → MSC |
| Message Type | BS → MSC |
| SOCI (Service Option Connection Identifier) (Add) | BS → MSC |

Parameters included in the "Progress" message, which is transmitted from the MSC to the mobile station for instructing to produce or clear a local tone, are shown in Table 8, in which the SOCI is included in transmission.

TABLE 8

| Information elements | Element Direction |
| --- | --- |
| Protocol Discriminator | BS → MSC |
| Reserved - Octet | BS → MSC |
| Message Type | BS → MSC |
| Signal | BS → MSC |
| MS Information Records | BS → MSC |
| SOCI (Service Option Connection Identifier) (Add) | BS → MSC |

Parameters included in the "Alert-with-Information" message transmitted to ring a bell of the mobile station from the MSC to the BSC are shown in Table 9, in which the SOCI is included with these parameters.

TABLE 9

| Information elements | Element Direction |
| --- | --- |
| Protocol Discriminator | MSC → BS |
| Reserved - Octet | MSC → BS |
| Message Type | MSC → BS |
| MS Information Records | MSC → BS |
| SOCI (Service Option Connection Identifier) (Add) | MSC → BS |

Parameters included in the "Flash-with-Information" message transmitted to MSC from the BSC to pass the supplementary service information from the mobile station are shown in Table 10, in which the SOCI is included with these parameters. This message may be sent from the MSC to the BSC for some features.

TABLE 10

| Information elements | Element Direction |
| --- | --- |
| Protocol Discriminator | BS ↔ MSC |
| Reserved - Octet | BS ↔ MSC |
| Message Type | BS ↔ MSC |
| Called Party BCD Number | BS ↔ MSC |
| Signal | MSC ↔ BS |
| Message Waiting Indication | MSC ↔ BS |
| Calling Party ASC Number | MSC ↔ BS |
| Tag | MSC ↔ BS |
| MS Information Records | BS ↔ MSC |
| SOCI (Service Option Connection Identifier) (Add) | BS ↔ MSC |

Parameters included in a "Flash-with-Information ACK" message that is an acknowledgment message to the "Flash-with Information" message are shown in Table 11, in which the SOCI is included with these parameters.

TABLE 11

| Information elements | Element Direction |
| --- | --- |
| Protocol Discriminator | BS → MSC |
| Reserved - Octet | BS → MSC |
| Message Type | BS → MSC |
| Tag | BS → MSC |
| SOCI (Service Option Connection Identifier) (Add) | BS → MSC |

Parameters included in the "Rejection" message transmitted from the BSC to the MSC to report that the mobile station rejected the "Command" message are shown in Table 12, in which the SOCI is included with these parameters.

TABLE 12

| Information elements | Element Direction |
|---|---|
| Protocol Discriminator | BS → MSC |
| Reserved - Octet | BS → MSC |
| Message Type | BS → MSC |
| Mobile Identity (IMSI) | BS → MSC |
| Mobile Identity (ESN) | BS → MSC |
| IS - 2000 Cause Value | BS → MSC |
| SOCI (Service Option Connection Identifier) (Add) | BS → MSC |

The invention described hereinabove and broadly described in the claims has many advantages. For example, it efficiently provides concurrent service, which is an essential function of the third generation mobile communication network in a multimedia environment. Additionally, it minimizes the conventional call processing procedures on the interface between the BSC and the MSC, thereby allowing a subscriber to use a new service without stopping the current service. It also allows a subscriber to concurrently use a plurality of services, such as voice and packet data services. Furthermore, the invention can flexibly confront future development directions of a communications network.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for providing concurrent services in a wireless communication system, the method comprising:
   maintaining a communication link between a mobile station and a base station controller (BSC) to provide a first service using one logical signaling connection, wherein the first service corresponds to a first service identifier;
   requesting a second service to the BSC;
   allocating a second service identifier in the BSC for the second service to concurrently provide the first and second services on the same logical signaling connection; and
   providing the first and the second services between the mobile station and the BSC by controlling each of the first and second services on the same logical signaling connection between the BSC and a mobile switching center (MSC) by using the corresponding service identifier of each of the services.

2. The method of claim 1, wherein the logical signaling connection comprises a signaling connection control part (SCCP) connection between the BSC and the MSC, and wherein the logical signaling connection further comprises a source local reference number/destination local reference number (SLR/DLR).

3. The method of claim 1, wherein each of the first and second service identifiers comprises an interface element identifier field, a length field, and a service option connection identifier field.

4. The method of claim 1, wherein an additional service request is transmitted from the BSC to the MSC when a request for the second service is received by the BSC from at least one of the mobile station and the MSC.

5. The method of claim 4, wherein the additional service request comprises a service option connection identifier.

6. The method of claim 4, wherein the additional service request further comprises a service option.

7. The method of claim 4, further comprising
   providing an additional service notification message from MSC to BSC, wherein the additional service notification message comprises at least one of a service option, a mobile identifier and a message type.

8. The method of claim 1, wherein the first and second services are further controlled according to whether the service is a packet based service or a circuit based service.

9. The method of claim 8, wherein an additional service request is transmitted from the. BSC to the MSC when a request for the second service is received by the BSC from at least one of the mobile station and the MSC, and wherein when the service is the circuit based service, then the additional service request comprises at least one of a called parity BCD number, a service option, a voice privacy request, a called party ASCII number, a circuit identify code, service option connection identifier.

10. A method for subscribing concurrent services in a mobile station, the method comprising:
    maintaining a communication link with a base station controller (BSC) to communicate a first service using one logical signaling connection, wherein the first service corresponds to a first service identifier;
    requesting a second service from the mobile station to the BSC;
    receiving a service assignment message from the BSC, the service assignment message comprising a service reference identifier corresponding to a second service identifier allocated in the BSC for the second service to concurrently provide the first and second services on the same logical signaling connection; and
    utilizing the first and the second services provided by the BSC wherein each of the first and second services are provided on the same logical signaling connection between the BSC and a mobile switching center (MSC) by using the corresponding service identifier of each of the services.

11. The method of claim 10, wherein, the service assignment message further comprises a connection reference information corresponding to the second service identifier.

12. The method of claim 10, wherein the first and second services are further controlled according to whether the service is a packet based service or a circuit based service.

13. The method of claim 10, wherein the logical signaling connection comprises a signaling connection control part (SCCP) connection between the BSC and the MSC, and wherein the logical signaling connection further comprises a source local reference number/destination local reference number (SLR/DLR).

14. The method of claim 10, wherein each of the first and second service identifiers comprises an interface element identifier field, a length field, and a service option connection identifier field.

15. A system for providing concurrent services in a wireless communication system, the system comprising:
    a base station controller (BSC) for maintaining a communication link with a mobile station to provide a first service using one logical signaling connection, wherein the first service corresponds to a first service identifier;
    means for requesting a second service to the BSC;

means for allocating a second service identifier in the BSC for the second service to concurrently provide the first and second services on the same logical signaling connection; and means for providing the first and the second services between the mobile station and the BSC by controlling each of the first and second services on the same logical signaling connection between the BSC and a mobile switching center (MSC) by using the corresponding service identifier of each of the services.

16. The system of claim 15, wherein the logical signaling connection comprises a signaling connection control part (SCCP) connection between the BSC and the MSC, and wherein the logical signaling connection further comprises a source local reference number/destination local reference number (SLR/DLR).

17. The system of claim 15, wherein each of the first and second service identifiers comprises an interface element identifier field, a length field, and a service option connection identifier field.

18. The system of claim 15, wherein an additional service request is transmitted from the BSC to the MSC when a request for the second service is received by the BSC from at least one of the mobile station and the MSC.

19. The system of claim 18, wherein the additional service request comprises a service option connection identifier.

20. The system of claim 19, wherein the additional service request further comprises a service option.

21. The system of claim 18, further comprising
providing an additional service notification message from MSC to BSC, wherein the additional service notification message comprises at least one of a service option, a mobile identifier and a message type.

22. The system of claim 15, wherein the first and second services are further controlled according to whether the service is a packet based service or a circuit based service.

23. The system of claim 22, wherein an additional service request is transmitted from the BSC to the MSC when a request for the second service is received by the BSC from at least one of the mobile station and the MSC, and wherein when the service is the circuit based service, then the additional service request comprises at least one of a called parity BCD number, a service option, a voice privacy request, a called party ASCII number, a circuit identify code, service option connection identifier.

24. A mobile station for subscribing concurrent services, the mobile station comprising:

means for maintaining a communication link with a base station controller (BSC) to communicate a first service using one logical signaling connection, wherein the first service corresponds to a first service identifier;

means for requesting a second service from the mobile station to the BSC;

means for receiving a service assignment message from the BSC, the service assignment message comprising a service reference identifier corresponding to a second service identifier allocated in the BSC for the second service to concurrently provide the first and second services on the same logical signaling connection; and means for utilizing the first and the second services provided by the BSC wherein each of the first and second services are provided on the same logical signaling connection between the BSC and a mobile switching center (MSC) by using the corresponding service identifier of each of the services.

25. The mobile station of claim 24, wherein, the service assignment message further comprises a connection reference information corresponding to the second service identifier.

26. The mobile station of claim 24, wherein the first and second services are further controlled according to whether the service is a packet based service or a circuit based service.

27. The mobile station of claim 24, wherein the logical signaling connection comprises a signaling connection control part (SCCP) connection between the BSC and the MSC, and wherein the logical signaling connection further comprises a source local reference number/destination local reference number (SLR/DLR).

28. The mobile station of claim 24, wherein each of the first and second service identifiers comprises an interface element identifier field, a length field, and a service option connection identifier field.

29. A method for providing concurrent services in a wireless communication system, the method comprising:

supporting a plurality of concurrent services using a base station controller (BSC) and a mobile switching center (MSC), wherein the plurality of concurrent services are provided using a single logical signaling connection between the BSC and the MSC;

associating a plurality of service identifiers with corresponding plurality of concurrent services to distinguish each one of the plurality of concurrent services; and communicating messages between the BSC and the MSC using the at least one of the plurality of service identifiers when corresponding one of the plurality of concurrent services is being provided, wherein the messages comprise at least one of:

a connect message comprising: protocol discriminator, message type, service option connection identifier;

a progress message comprising: protocol discriminator, message type, signal, MS information records, service option connection identifier;

an alert-with-information message comprising: protocol discriminator, message type, MS information records, service option connection identifier;

a flash-with-information message comprising: protocol discriminator, message type, called party BCD number, signal, message waiting indication, calling party ASC number, tag, MS information records, service option connection identifier;

a flash-with-information ACK message comprising: protocol discriminator, message type, tag, service option connection identifier, service option connection identifier;

a rejection message comprising: protocol discriminator, message type, mobile identity (IMSI), mobile identity (ESN), IS-2000 cause value, service option connection identifier.

30. A system for providing concurrent services in a wireless communication system, the system comprising:

means for supporting a plurality of concurrent services using a base station controller (BSC) and a mobile switching center (MSC), wherein the plurality of concurrent services are provided using a single logical signaling connection between the BSC and the MSC;

means for associating a plurality of service identifiers with corresponding plurality of concurrent services to distinguish each one of the plurality of concurrent services; and means for communicating messages between the BSC and the MSC using the at least one of the plurality of service identifiers when corresponding one of the plurality of concurrent services is being provided, wherein the messages comprise at least one of:

a connect message comprising: protocol discriminator, message type, service option connection identifier;

a progress message comprising: protocol discriminator, message type, signal, MS information records, service option connection identifier;

an alert-with-information message comprising: protocol discriminator, message type, MS information records, service option connection identifier;

a flash-with-information message comprising: protocol discriminator, message type, called party BCD number, signal, message waiting indication, calling party ASC number, tag, MS information records, service option connection identifier;

a flash-with-information ACK message comprising: protocol discriminator, message type, tag, service option connection identifier, service option connection identifier; and a rejection message comprising: protocol discriminator, message type, mobile identity (IMSI), mobile identity (ESN), IS-2000 cause value, service option connection identifier.

* * * * *